Feb. 25, 1941.  J. DAUGHERTY  2,233,095
FEED CONTROL FOR METAL PLANERS
Filed May 9, 1938  4 Sheets-Sheet 1
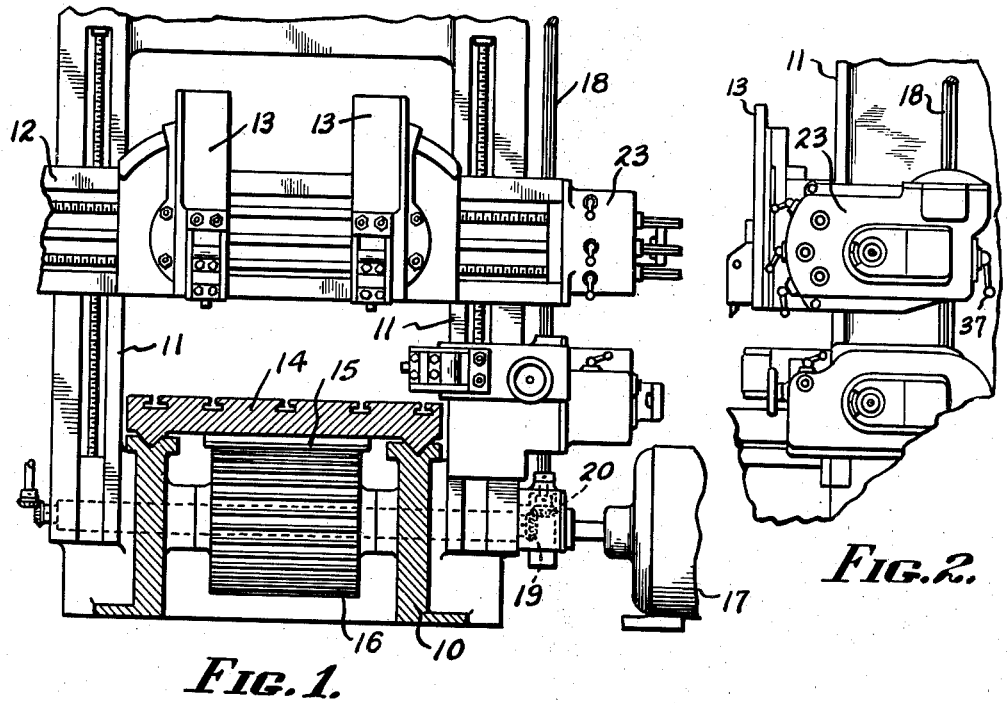
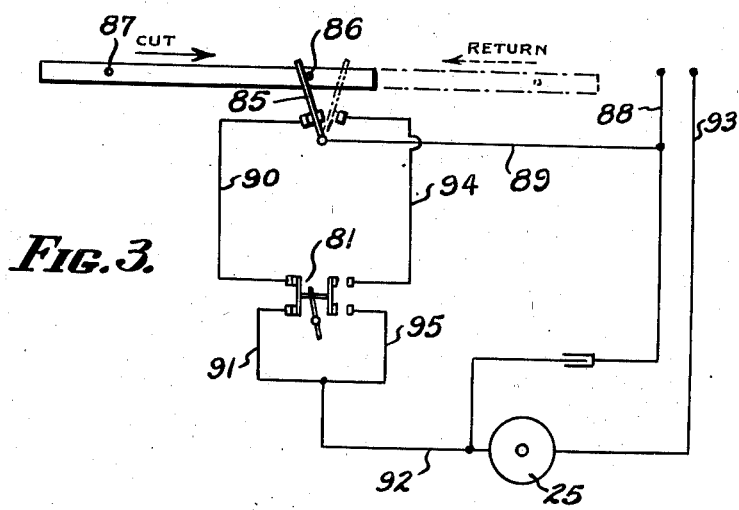
INVENTOR.
JESSE DAUGHERTY.
BY
Allen & Allen
ATTORNEYS.

INVENTOR.
JESSE DAUGHERTY.
BY Allen & Allen
ATTORNEYS.

Feb. 25, 1941.  J. DAUGHERTY  2,233,095
FEED CONTROL FOR METAL PLANERS
Filed May 9, 1938  4 Sheets-Sheet 3

INVENTOR.
JESSE DAUGHERTY.
BY Allen & Allen
ATTORNEYS.

Feb. 25, 1941. J. DAUGHERTY 2,233,095
FEED CONTROL FOR METAL PLANERS
Filed May 9, 1938 4 Sheets-Sheet 4

INVENTOR.
JESSE DAUGHERTY.
BY
Allen & Allen
ATTORNEYS.

Patented Feb. 25, 1941

2,233,095

UNITED STATES PATENT OFFICE 2,233,095

FEED CONTROL FOR METAL PLANERS

Jesse Daugherty, Cincinnati, Ohio, assignor to The Cincinnati Planer Company, Cincinnati, Ohio, a corporation of Ohio Application May 9, 1938, Serial No. 206,799

12 Claims. (Cl. 90—49)

This invention relates to a feed control which is primarily useful in connection with planers. The modern planer consists of a bed upon which a work table is reciprocable, said work table being driven by reversing motive means of one sort or another, and standards are provided upon which a cross head is mounted. The cross head is arranged to be movable vertically of the standards and carries one or more tool carrying heads which are mounted for movement longitudinally of the cross head.

In planing a piece of work, the work table is moved at cutting speed in one direction while the cutting tools take their cut. At the end of the cutting stroke the work table is reversed and at some time prior to the next cutting stroke the tools are fed an appropriate distance to be in readiness for the next cutting stroke.

It is an object of my invention to provide a device for causing feeding movement prior to the cutting stroke of a planer. It is another object of my invention to provide a device which will automatically feed the tool heads any predetermined distance for each cutting stroke. Another object of my invention is to provide means whereby the amount of feed desired may be set by the operator by simply turning a conveniently located knob.

It is a further object of my invention to provide a magnetic clutch for engaging a gear train for feeding movement and to provide a measuring device which will disengage said magnetic clutch when the predetermined feeding movement has taken place. It is a still further object of my invention to provide a mechanism whereby said disengaging mechanism is reset automatically for each successive operation. Further objects of my invention include the provision of a device, as above outlined, which is as simple as the circumstances will permit, and which will be accurate and reliable and will stand up under machine shop usage.

These and other objects of my invention which will be pointed out more specifically hereinafter or which will be apparent to one skilled in the art upon reading these specifications, I accomplish by that certain construction and arrangement of parts of which I shall now describe an exemplary embodiment. Reference is now made to the drawings forming a part hereof, and in which:

Figure 1 is an end elevation of a planer main frame with the bed and table shown in cross section.

Fig. 2 is a view of the gear and control box as seen from the right hand side of Fig. 1.

Fig. 3 is a simplified wiring diagram of the device.

Figure 4:
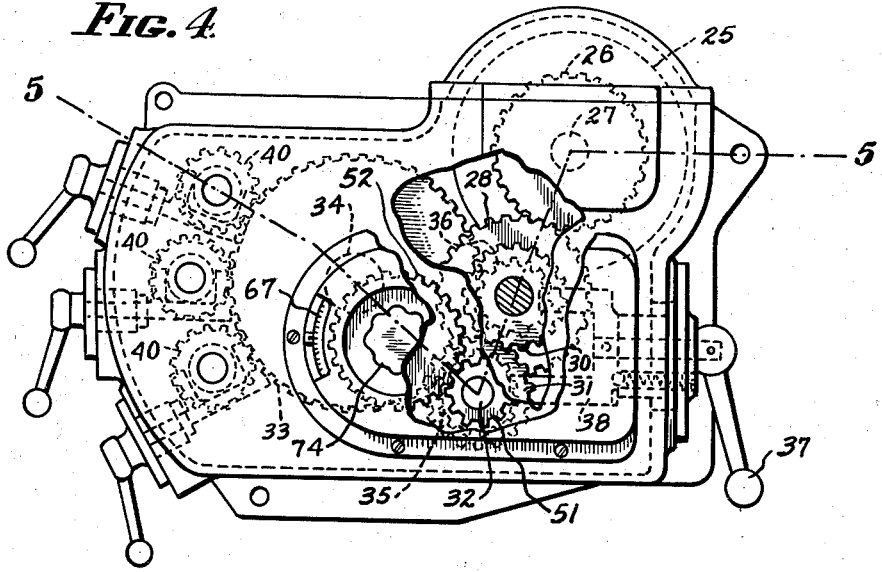
Fig. 4 is an enlarged view of the gear box shown in Fig. 2 with parts broken away to show the arrangement of gears therein.

Briefly, my invention is applied to a conventional planer in the following manner. In Fig. 1 I have shown a planer having a bed 10 and vertical standards 11, upon which is mounted a cross head 12. The cross head 12 carries the tool holding heads 13 in a manner well known. A work table 14 is mounted in conventional manner for reciprocating movement upon the bed 10 and carries on its under side a rack 15 which is adapted to mesh with a bull gear 16 appropriately journaled in the bed 10. A train of reduction gearing (not shown) connects a reversible driving motor 17 to the bull gear 16 whereby the table 14 is caused to reciprocate.

A vertical splined shaft 18 is driven from a power take-off from the bull gear through the miter gears 19 and 20. It will, of course, be understood that separate motive means may be provided for driving the feed mechanism if desired.

Figure 5:
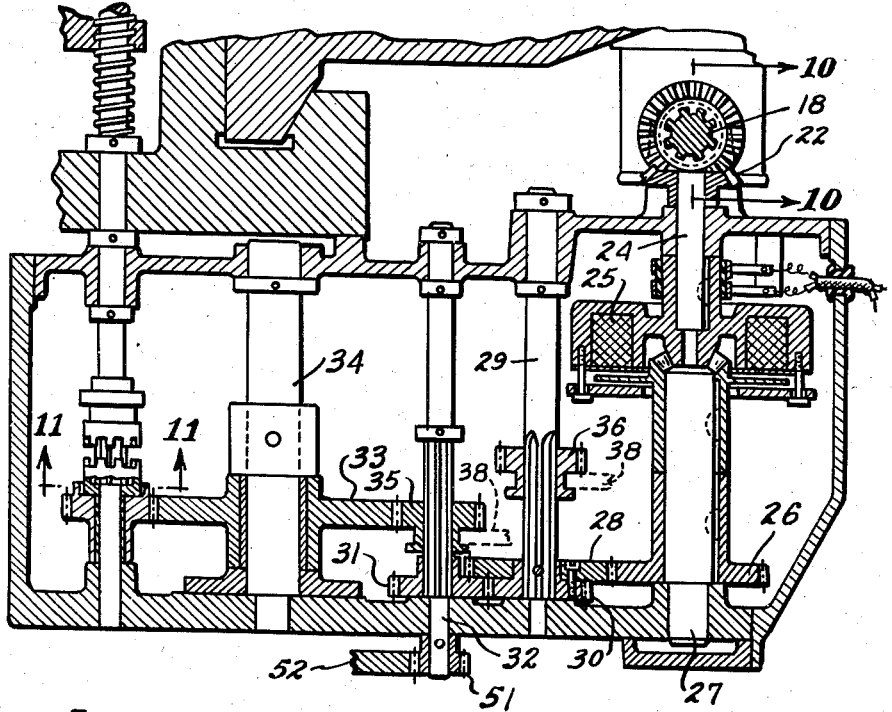
Fig. 5 is a cross sectional view of the gear box taken on the regular line 5—5 of Fig. 4.
Figure 6:
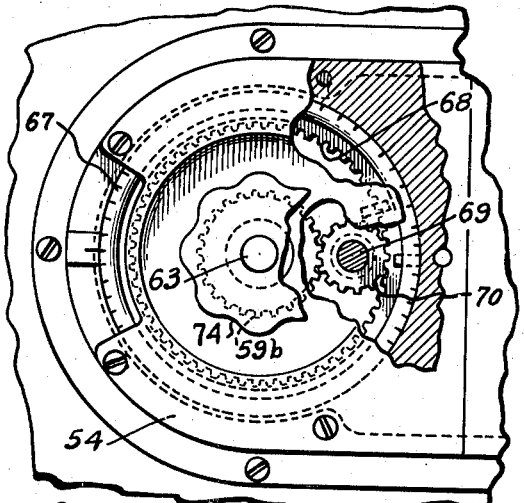
Fig. 6 is a partial elevational view of the control box with parts broken away to show the inner construction.
Figure 10:
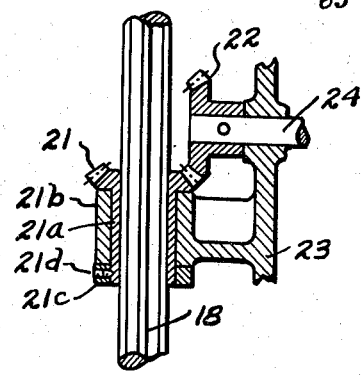
Fig. 10 is a cross sectional view taken on the line 10—10 of Fig. 5.
Figure 9:
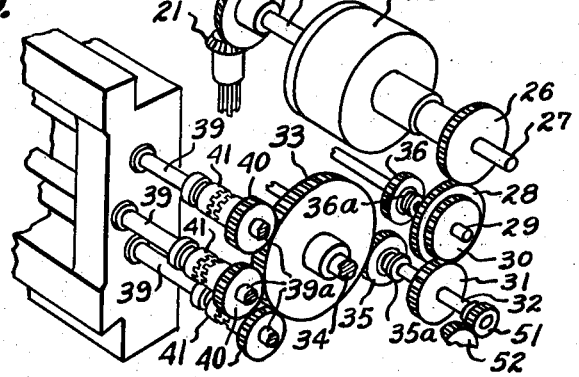
Fig. 9 is a perspective view showing the position of the various gears in the driving train.

The reciprocatory rotation of the splined shaft 18 is transmitted into the gear box by means of the miter gears 21 and 22. Referring more particularly to Figs. 5, 9, and 10, it will be seen that the miter gear is splined so that it may slide vertically upon the splined shaft 18 and has an elongated hub 21a which is journaled in a portion 21b of the gear box housing 23. A collar 21c is secured to the lower end of the hub 21a as by a set screw 21d. From this description it will be clear that as the gear box housing 23, which, of course, is mounted on the end of the cross head 12, moves up and down, it carries with it the gear 21, which at all times remains in driving relation with the splined shaft 18. The miter gear 22 which meshes with the splined gear 21 is mounted upon a shaft 24, upon the other end of which is mounted one element of the magnetic clutch, indicated in Fig. 9 generally at 25. The clutch 25 is shown more or less conventionally in Fig. 5 in cross section and a detailed description of this member is not thought to be necessary since the structure forms no part of my invention.

The other member of the magnetic clutch 25 drives a gear 26 through a shaft 27. The gear 26 is disposed to mesh with a gear 28 mounted upon the shaft 29. Integral with or fixed to the gear 28 is a gear 30, adapted to mesh with a gear 31 mounted upon a shaft 32. The gear 33 mounted upon the shaft 34 may be driven from the preceding train of gears either through the gear 35 slidably mounted upon the shaft 32, or the gear 36 slidably mounted upon the shaft 29. It will be understood that a lever 37 (see Fig. 4) is provided which lever has a fork connected therewith, one arm of which engages the clutch groove 36a of the gear, and the other of which engages the clutch groove 35a of the gear 35. It will be understood that that portion of the gear train just described constitutes a reversing mechanism.

The various cross shafts 39 are driven from the gear 33 through the pinions 40 meshing therewith through the clutch 41.

With the gear train just described, it will be understood that as the work table moves in one direction the splined shaft 18 will rotate in one direction, and assuming that the clutch 25 is engaged, any of the shafts 39 which are clutched by means of the clutch 41 will also be driven in one direction and that when the work table moves in the other direction the entire train will be reversed.

In providing for feeding movement of the various shafts 39, it is desirable that only rotation of the splined shaft 18 in one direction be permitted and for this reason the gears 40 have a construction which will now be described.

Figure 11:
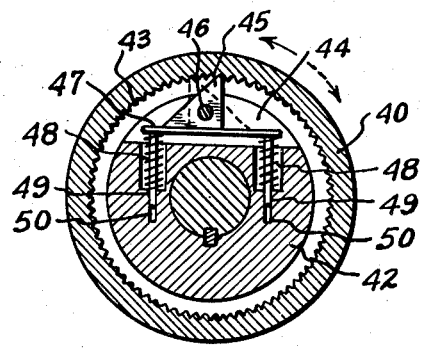
Fig. 11 is a cross sectional view taken on the line 11—11 of Fig. 5.

Referring to Fig. 11, a hub member 42 is keyed to the stub shaft 39 which carries the gear 40, and the gear 40 is provided with an annular flange having internal ratchet teeth 43. It will be noted that the diameter of the hub 42 is somewhat smaller than the diameter of the ratchet 43. The hub member 42 is transversely slotted as shown at 44, and a triangular pawl 45 is mounted upon a pin 46 in the slot 44. A supporting element 47 is urged against the base of the pawl 45 by the springs 48 guided upon the pins 49, riding in the bores 50 in the hub 42. By means of this construction it will be seen that the pawl 45 may assume two positions only, which may be said to drive in either direction and pass in the other. For example, in the position shown, it will be clear that clockwise movement of the hub 42 will be transmitted to the gear 40 while counterclockwise movement will be passed. If the pawl 45 were rotated in a clockwise direction through an angle of 90 degrees a reverse effect would be obtained.

By the means described it will be seen that rotation of the splined shaft 18 in one direction (assuming the clutch 25 to be engaged) may be caused to produce a rotation in one direction of the shafts 39 (assuming the clutches 41 to be engaged, the direction of rotation of the shafts 39, with respect to the shaft 18, depending upon the position of the reversing gears 35 and 36.)

I prefer to cause the engagement of the clutch 25 to be produced incident to the work table reaching the end of each stroke. Thus at the end of the return stroke the solenoid of the magnetic clutch is energized and a feeding movement of the shafts 39 will take place. The basic part of my invention resides in the provision of means whereby disengagement of the clutch 25 will be produced after a predetermined amount of feeding movement. Then at the end of the cutting stroke the clutch is again automatically energized and by virtue of the reverse rotation of the splined shaft 18, the above described gear train rotates in a reverse direction bringing the feed measuring device back to its original position but not affecting the shafts 39 by virtue of the ratchet and pawl construction described above.

Figure 8A:
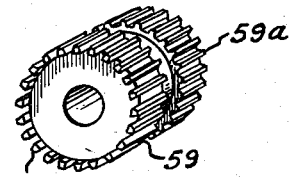
Fig. 8a is a detailed perspective view of one of the gears utilized in the control gear train.
Figure 7:
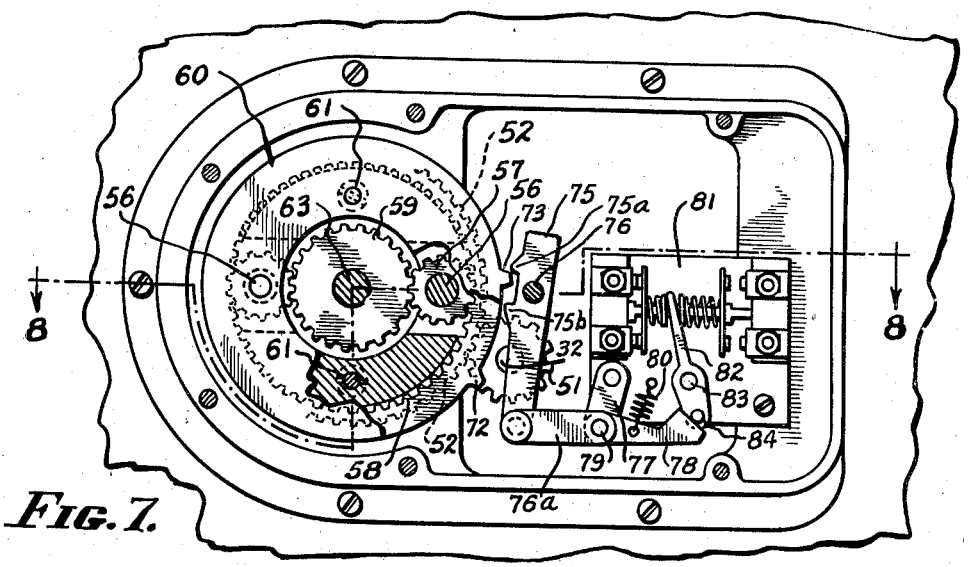
Fig. 7 is an elevational view of the measuring device with the cover removed.
Figure 8:
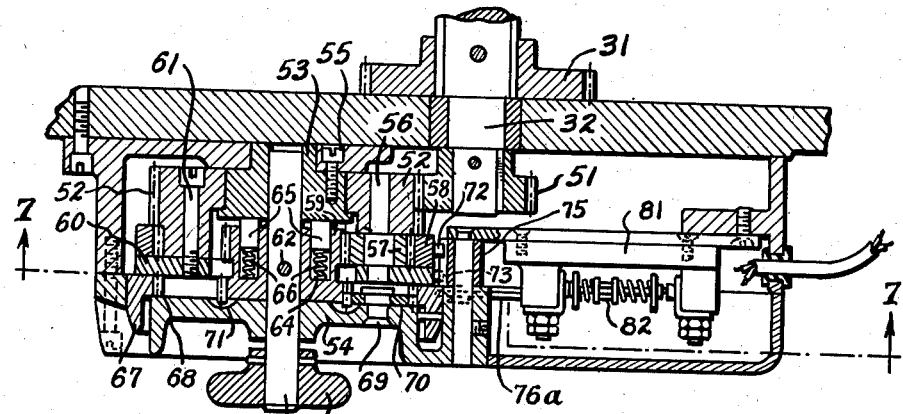
Fig. 8 is a cross sectional view of the control box taken on the irregular line 8—8 of Fig. 7.

The drive for the feed measuring device is taken off the shaft 32 by means of a pinion 51. Referring now particularly to Figs. 7 and 8, the pinion 51 meshes with a gear 52, mounted upon a hub 53, said hub being fastened to the control box housing 54 by means of the machine screws 55. The gear 52 carries the studs 56 upon which are mounted the planet gears 57. The planet gear 57 meshes with the internal gear 58 and also with the sun gear, generally indicated at 59. The gear 59, shown in detail in Fig. 8a, comprises two gear portions 59a and 59b, the teeth of the latter of which project beyond the end of the gear as indicated at 59c. An annular disc 60 is fastened to the gear 52 by means of the machine screws 61. The sun gear 59 mentioned above is pinned, as by a pin 62, to the shaft 63, which is journaled in the front of the housing 54 and in the hub 53 mentioned above. The sun gear 59 is provided with bores 64 within which are mounted the pins 65, urged outwardly as by springs 66. The pins 65 bear against the face of the hub 53 thus tending to urge the gear 59 and the shaft 63 downwardly as seen in Fig. 8. A dial member 67 of annular form and provided with internal teeth 68 is mounted between the annular disc 60 and the front of the housing 54. Mounted on a stud 69 in the front of the housing 54 is the planet gear 70 adapted to mesh with the internal teeth 68 and also to mesh with the teeth 59b of the sun gear 59. A circular rack 71 is provided on the inside face of the front of the housing 54, the teeth of which are adapted to cooperate with the portions 59c of the sun gear 59 to form a clutch.

From the foregoing description, it will be clear that as the gear 51 on the shaft 32 rotates, the gear 52 is caused to rotate whereby the studs 56 are caused to revolve and the planet gears 57 to rotate and revolve whereby rotary motion is transmitted to the internally toothed gear 58. The gear 52 in its rotation will carry with it the annular disc 60.

The gear 58 is provided with a dog 72, and the disc 60 is provided with a similar dog 73. It will be clear (assuming the entire mechanism to be at a standstill) that the distance between the dogs 72 and 73 can be adjusted by turning the knob 74 while pushing it inwardly against the tension of the springs 66. When the shaft 63 is pushed inwardly the teeth 59c are disengaged from the rack 71 and the sun gear 59 is rotated, which rotation is transmitted to the gear 58 through the planet gears 57. Coincident with this action, the dial 67 is also moved through the portion 59b of the sun gear 59 and the planet pinion 70 meshing with the internal teeth 68 of the dial.

It will now be understood that if mechanism is provided for engaging the magnetic clutch 25 incident to the travel of the work table, and if means are provided to cause the dogs 72 and 73 (depending upon the direction of rotation) to disengage the clutch 25, the length of feeding movement may be predetermined.

Referring now to Fig. 7, the mechanism for disengaging the clutch is there shown in detail. A lever 75 is pivoted at 76 and is provided with two cam surfaces 75a and 75b. A link 76a is attached to the end of the lever 75 and connects said lever with the lever 77. A cam lever 78 is pivoted at 79 to the connection between the levers 76 and 77, and is urged in a counterclockwise direction by means of the spring 80. Indicated generally at 81 is a switch which may be actuated by means of a lever 82, pivoted at 83, and carrying on its lower end a cam follower 84. It will now be seen that if the lever 75 is caused to rock in a counterclockwise direction the point 79 will be moved toward the right and the cam action of the lever 78 will be caused to rock downwardly or clockwise until its cam portion passes the cam follower 84. As soon as this happens, the tension in the spring 80 tending to urge the lever 78 upwardly or counterclockwise will cause the lever 82 to be swung in a clockwise direction, and thereby cause actuation of the switch 81.

Figure 7A:
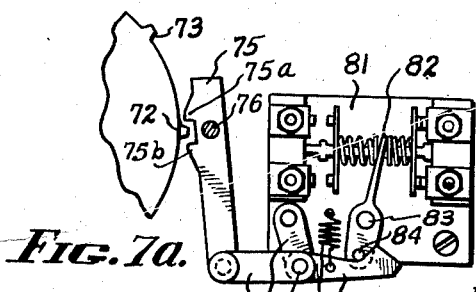
Fig. 7a is a detailed view of certain parts shown in Fig. 7 in a different position.

Referring to Fig. 3, where I have shown a simple wiring diagram, there is provided a work table actuated switch 85. This switch is actuated by the pins 86 and 87, one at each end of each stroke. With the parts shown as in Fig. 3, i. e., at the very end of the return stroke, the switch member 85 has been thrown to the left and with the switch 81 in the position shown, a circuit is completed through the leads 88, 89, 90, 91, 92 and 93, whereby the solenoid of the magnetic clutch 25 is energized and feeding action takes place. This situation is depicted in Fig. 7 and the dog 72 is now traveling in a counterclockwise direction. When the dog 72 rides up on the cam surface 75b, the above described mechanism throws the switch 81 over to the position shown in Fig. 7a, whereby the circuit between the leads 90 and 91 is broken and feeding action ceases.

When the work table reaches the end of the cutting stroke the switch member 85 will be thrown to the position shown in dotted lines in Fig. 3 by the pin 87, and since the switch member 81 is now in its right hand position closing the circuit between the leads 94 and 95, the clutch 25 will again be energized and rotation of the entire gear train will take place in a reverse direction. By virtue of the construction described in connection with Fig. 11, this reverse rotation will not be transmitted to the cross shafts 39. At the end of the cutting stroke, referring to Fig. 7a, the parts are in the position shown. Thereupon at the beginning of the return stroke, the dog 73 will travel in a clockwise direction and a reverse movement of the entire controlled gear train will take place until the dog 73 rides up on the cam surface 75a, throwing the switch back to the position of Fig. 7, whereupon the magnetic clutch is again de-energized.

It is believed that the operation of my device will be clear from the foregoing description and it will be understood that various modifications may suggest themselves to those skilled in the art.

Various modifications may be made without departing from the spirit of my invention, and while I have disclosed it in connection with a planer, it will be understood that it is applicable to any machine tool in which one element is cyclically fed with respect to another element, and I therefore wish it to be understood that I do not intend to limit myself otherwise than as pointed out in the claims which follow.

Having thus described my invention, what I claim as new and desire to secure by Letters Patent is:

1. In a machine tool having a drive, a work support, and a tool holder, means including a clutch for causing relative feeding movement between said support and holder, a circuit including a switch cyclically actuated to cause engagement of said clutch, and means including a second switch in said circuit for causing disengagement of said clutch after a predetermined amount of feeding movement and for setting up said circuit for reenergization of said clutch by a successive actuation of said first mentioned switch.

2. In a machine tool having a drive, a work support and a tool holder, means including a clutch for causing relative feeding movement between said support and holder, means for cyclically causing engagement of said clutch, and means for causing disengagement of said clutch after a predetermined amount of feeding movement, said means including a member driven from said drive and having a switch actuating dog fixedly mounted thereon, a second member driven by said first mentioned member and also carrying a switch actuating dog, a switch positioned to be actuated in one direction by one of said dogs and in the other direction by the other of said dogs, means for initially setting the angular position of one of said dogs with respect to the other, and a dial actuated by said means and movable in synchronism with said settable dog, whereby the angular relation of said dogs and thereby the amount of feed may be determined by reading said dial.

3. In a machine tool having a drive, a work support, and a tool holder, means including a clutch for causing relative feeding movement between said support and holder, means for cyclically causing engagement of said clutch, and means for causing disengagement of said clutch after a predetermined amount of feeding movement, said last mentioned means including a housing, a member driven by said drive, said member constituting the spider of an epicyclic gear train and carrying a planetary gear and a disc provided with a switch actuating dog, a sun gear engaged by said planetary gear, an internally toothed gear engaged by said planetary gear and carrying a second switch actuating dog, a dial member having internal teeth corresponding to those on said internally toothed gear, a planetary gear mounted in the housing and having teeth corresponding to those of said first mentioned planetary gear and engaging said sun gear, said sun gear and said housing having cooperating clutch elements and said sun gear being normally urged to clutching relation with said housing, means for disengaging said clutch elements and rotating said sun gear to vary the angular spacing of said dogs and coincidentally setting said dial, and a switch positioned to be actuated in one direction by one of said dogs and in the other direction by the other of said dogs.

4. In a machine tool having a drive and a feedable tool holder, means including a clutch for imparting feeding movement from said drive to said holder, a circuit including a switch cyclically actuated to cause engagement of said clutch, and means including a second switch in said circuit for causing disengagement of said clutch after a predetermined amount of feeding movement and for setting up said circuit for reenergization of said clutch by a successive actuation of said first mentioned switch.

5. In a planer having a tool holder, a drive for said planer, means including a magnetic clutch for imparting feeding movement from said drive to said holder, a circuit including a switch for causing energization of said clutch at each end of the stroke of said planer, a second switch in said circuit for causing deenergization of said clutch after a predetermined amount of feeding movement and for setting up said circuit for reenergization of said clutch by a successive actuation of said first mentioned switch, said first mentioned means including unidirectional power transmitting means, whereby feeding movement of said holder is produced only at one end of said stroke.

6. In a planer having a tool holder, a drive for said planer, means including a magnetic clutch for imparting feeding movement from said drive to said holder, a circuit including a switch for causing energization of said clutch at each end of the stroke of said planer, a second switch in said circuit for causing deenergization of said clutch and for setting up said circuit for reenergization of said clutch by a successive actuation of said first mentioned switch, mechanism including an epicyclic gear train driven from said drive for actuating said second switch, said first mentioned means including unidirectional power transmitting means, whereby feeding movement of said holder is produced only at one end of said stroke.

7. In a planer having a bed upon which a work table is reciprocably mounted, reversible driving means for said table, and a main frame upon which a cross head is vertically movable, said cross head carrying tool holders and being provided with shafts for producing feeding and traversing movement of said tool holders, a power take off from said driving means for imparting reversible rotating movement to a vertical shaft, and a mechanical train including a clutch for transmitting motion from said vertical shaft to said feeding and traversing shafts, and means actuated by said table at each end of its stroke for causing engagement of said clutch; mechanism for causing disengagement of said clutch after a predetermined amount of motion has been transmitted to said feeding and traversing shafts, and uni-directional power transmitting devices in connection with said feeding and traversing shafts, whereby engagement of said clutch is effective in producing feeding motion only at one end of the stroke of said table.

8. In a planer having a bed upon which a work table is reciprocably mounted, reversible driving means for said table, a main frame upon which a cross head is vertically movable, said cross head carrying tool holders and being provided with shafts for producing feeding and traversing movement of said tool holders, a power take off from said driving means for imparting reversible rotating movement to a vertical shaft, a mechanical train including a magnetic clutch for transmitting motion from said vertical shaft to said feeding and traversing shafts, and a switch actuated by said table at each end of its stroke to energize said clutch; a device for causing disengagement of said clutch after a predetermined length of feeding movement, said device including a double pole double throw switch mounted in a housing and connected in parallel with said first mentioned switch, whereby when said first switch has been actuated in one direction to energize said clutch, an actuation of said double switch will break the circuit and set it up for reenergization by an actuation of said first switch in the opposite direction, and means for actuating said second switch comprising a member driven by said train, said member constituting the spider of an epicyclic gear train and carrying a planetary gear and a disc provided with a dog for actuating said second switch in one direction, a sun gear engaged by said planetary gear and carrying a second dog for actuating said second switch in the other direction, a dial member having internal teeth corresponding to those on said internally toothed gear, a planetary gear mounted in the housing and having teeth corresponding to those of said first mentioned planetary gear and engaging said sun gear, said sun gear and said housing having cooperating clutch elements and said sun gear being normally urged into clutching relation with said housing, means for disengaging said clutch elements and rotating said sun gear to vary the angular spacing of said dogs and coincidentally setting said dial.

9. A device of the class described, comprising a driven member, said member constituting the spider of an epicyclic train and carrying a planetary gear and a dog provided with a switch actuating dog, a sun gear engaged by said planetary gear, an internally toothed gear engaged by said planetary gear and carrying a second switch actuating dog, a switch positioned to be actuated in one direction by one of said dogs and in the other direction by the other of said dogs, and means for initially adjusting the angular spacing of said dogs.

10. A device of the class described, comprising a driven member, a switch actuating dog fixedly mounted thereon, a second member driven by said first mentioned member and also carrying a switch actuating dog, a switch positioned to be actuated in one direction by one of said dogs and in the other direction by the other of said dogs, means for initially setting the angular position of one of said dogs with respect to the other, and a dial actuated by said means and movable in synchronism with said settable dog, whereby the angular relation of said dogs may be determined by reading said dial.

11. A device of the class described, comprising a housing, a driven member, said member constituting the spider of an epicyclic gear train and carrying a planetary gear and a disc provided with a switch actuating dog, a sun gear engaged by said planetary gear, an internally toothed gear engaged by said planetary gear and carrying a second switch actuating dog, a dial member having internal teeth corresponding to those on said internally toothed gear, a planetary gear mounted in the housing and having teeth corresponding to those of said first mentioned planetary gear and engaging said sun gear, said sun gear and said housing having cooperating clutch elements and said sun gear being normally urged into clutching relation with said housing, means for disengaging said clutch elements and rotating said sun gear to vary the angular spacing of said dogs and coincidentally setting said dial, and a switch positioned to be actuated in one direction by one of said dogs and in the other direction by the other of said dogs.

12. In combination with a double throw switch and a cam, a mechanism for throwing said switch from one side to the other including a pivoted element provided with cam followers, a pivoted switch actuating element, a pivoted lever and a link pivotally connected to said first mentioned element and said pivoted lever, an operating element pivoted to said last mentioned connection, said operating element being provided with opposed cam surfaces, a cam rider on said switch actuating element positioned to cooperate with one or the other of said opposed cam surfaces, the appropriate cam surface of said operating element being yieldably urged against said rider whereby said operating element may yield upon actuation of said first mentioned element to a point at which the opposite cam surface comes into operative relationship with said rider whereupon said yieldable means will cause said switch actuating element to throw the switch to its opposite position.

JESSE DAUGHERTY.